US006987700B1

(12) United States Patent
Hong et al.

(10) Patent No.: US 6,987,700 B1
(45) Date of Patent: Jan. 17, 2006

(54) METHOD AND SYSTEM FOR WRITING DATA TO A MEMORY

(75) Inventors: Chen-Kuan Eric Hong, San Jose, CA (US); Luc Bisson, San Jose, CA (US)

(73) Assignee: Via Technologies, Inc., Taipei (TW)

( * ) Notice: Subject to any disclaimer, the term of this patent is extended or adjusted under 35 U.S.C. 154(b) by 117 days.

(21) Appl. No.: 10/405,121

(22) Filed: Apr. 2, 2003

Related U.S. Application Data

(60) Provisional application No. 60/368,989, filed on Apr. 2, 2002, provisional application No. 60/368,991, filed on Apr. 2, 2002.

(51) Int. Cl.
*G11C 7/22* (2006.01)

(52) U.S. Cl. ...................... 365/194; 365/193; 365/233; 327/161

(58) Field of Classification Search ................ 365/194, 365/193, 233; 327/149, 161; 713/401
See application file for complete search history.

(56) References Cited

U.S. PATENT DOCUMENTS

| | | | | |
|---|---|---|---|---|
| 5,122,757 | A * | 6/1992 | Weber et al. | 327/105 |
| 5,268,656 | A * | 12/1993 | Muscavage | 331/45 |
| 5,546,434 | A * | 8/1996 | Kalafatis | 375/376 |
| 5,596,284 | A * | 1/1997 | Wykes et al. | 326/27 |
| 6,061,292 | A | 5/2000 | Su et al. | |
| 6,424,198 | B1 * | 7/2002 | Wolford | 327/291 |
| 6,466,491 | B2 | 10/2002 | Yanagawa | |
| 6,504,790 | B1 * | 1/2003 | Wolford | 365/233 |
| 2003/0221050 | A1 | 11/2003 | Hong et al. | |

* cited by examiner

*Primary Examiner*—Richard Elms
*Assistant Examiner*—J. H. Hur
(74) *Attorney, Agent, or Firm*—Finnegan, Henderson, Farabow, Garrett & Dunner, L.L.P.

(57) ABSTRACT

Methods and systems consistent with this invention write data to a memory. Such methods and systems may generate a clock signal, generate an intermediate clock signal from the clock signal using a clock tree buffer, delay the intermediate clock signal to form a data strobe signal, and write the data to the memory using the data strobe signal and a memory clock signal. Such methods and systems may also delay the intermediate clock signal to form the memory clock signal.

46 Claims, 6 Drawing Sheets

METHOD AND SYSTEM FOR WRITING DATA TO A MEMORY

RELATED APPLICATIONS

This application claims priority to U.S. Provisional Application Nos. 60/368,989 and 60/368,991, both filed Apr. 2, 2002, which are hereby incorporated by reference.

FIELD

Methods and systems consistent with this invention may relate to writing data to a memory, and in particular may relate to a controller circuit for writing data to a memory.

BACKGROUND

Generally, a memory controller circuit coordinates writing and reading data to and from a memory. The data may come from a central processing unit (CPU), for example. As the capacity of memory chips increases and CPUs become faster, there is a need for data to be stored and retrieved in memory chips at increasing speeds.

FIG. 1 is a block diagram of a controller circuit 102 and a memory 104 connected together. In this example, four signals span between controller 102 and memory 104: a clock signal MCLK, a data signal PD, a command signal CMD, and a data strobe signal DQS. FIG. 2 is a timing diagram illustrating some of the challenges of writing data to a memory. In this example, command signal CMD, data signal PD, data strobe signal DQS, and clock signal MCLK are all supplied from controller circuit 102 to memory circuit 104.

In the example of FIG. 2, command signal CMD triggers a write command at the rising edge of the signal MCLK. Data strobe signal DQS oscillates on and off at some time after the write command. Memory 104 uses strobe signal DQS to "clock" or "latch" in data signal PD into memory 104 at the rising and/or falling edge of strobe signal DQS. In this example, the rising edge of strobe signal DQS is timed so that it is in the "middle" of a data bit D0 of data signal PD. For example, as shown in FIG. 2, the rising edge of strobe signal DQS occurs at a data setup time Tds after the start of bit D0, but before the end of bit D0 by the data hold time Tdh. Further, the falling edge of strobe signal DQS is timed so that it is in the "middle" of a data bit D1 of data signal PD. For example, as shown in FIG. 2, the falling edge of strobe signal DQS occurs at a data setup time Tds after the start of bit D1, but before the end of bit D1 by the data hold time Tdh.

One of the challenges of controller circuit 102 is to supply data strobe signal DQS, data signal PD, and clock signal MCLK to memory 104 with precise timing so that the data is properly latched into memory 104 without error. For example, the values of Tds and Tdh may be 0.5 nanoseconds, a very short period of time.

SUMMARY

Methods and systems consistent with this invention write data to a memory. Such methods and systems may generate a clock signal, generate an intermediate clock signal from the clock signal using a clock tree buffer, delay the intermediate clock signal to form a data strobe signal, and write the data to the memory using the data strobe signal and a memory clock signal. Such methods and systems may also delay the intermediate clock signal to form the memory clock signal.

It is understood that both the foregoing general description and the following detailed description are exemplary and explanatory only and are not restrictive of the invention, as claimed.

The accompanying drawings, which are incorporated in and constitute a part of this specification, illustrate one several embodiments of the invention and together with the description, serve to explain the principles of the invention.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 3:
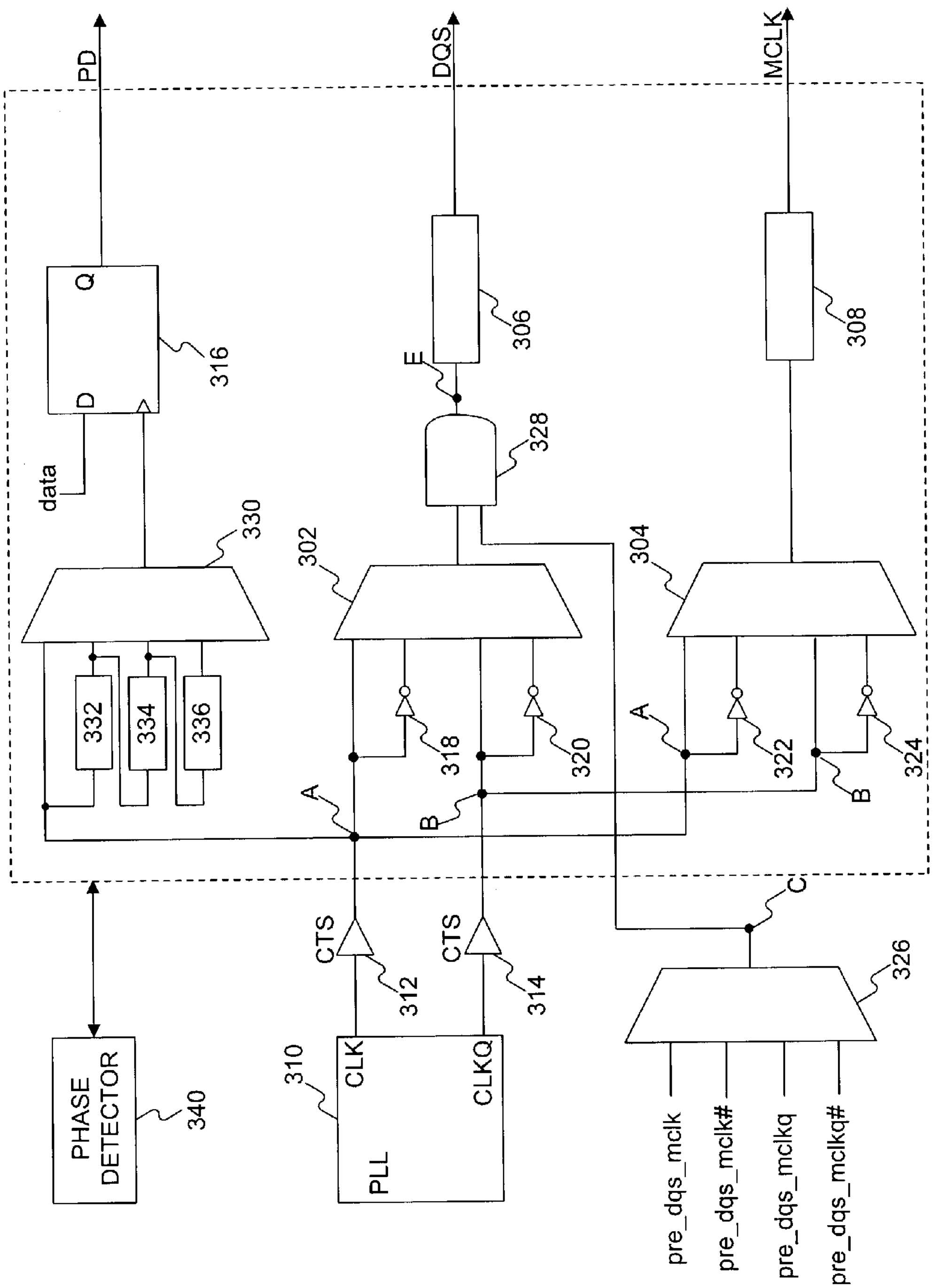
FIG. 3 is a circuit diagram of one embodiment of a control circuit consistent with this invention.

FIG. 3 is a circuit diagram of one embodiment of a control circuit consistent with this invention. A phase locked loop 310 supplies a clock signal CLK and a clock signal CLKQ, where clock signal CLKQ is 90 degrees ahead of or leading clock signal CLK. The clock signals CLK and CLKQ may be generated from the same base clock signal. The clock signals CLK and CLKQ may also be generated from the same clock generator. Clock signal CLK is fed through a clock tree buffer (CTS) 312 forming signal CTS_CLK (not shown) at node A. Signal CTS_CLK is fed through an inverter 322, forming signal CTS_CLK~ (not shown), which is 180 degrees out of phase from clock signal CTS_CLK. Clock signal CLKQ is fed through a clock tree buffer (CTS) 314 forming signal CTS_CLKQ (not shown) at node B. Signal CTS_CLKQ is fed through an inverter 324, forming signal CTS_CLKQ~ (not shown), which is 180 degrees out of phase from CTS_CLKQ. In the embodiment of FIG. 3, all four signals CTS_CLK, CTS_CLKQ, CTS_CLK~, and CTS_CLKQ~ are fed into a multiplexer 304.

Using a two-bit programmable input (not shown), multiplexer 304 selects one of the four signals CTS_CLK, CTS_CLKQ, CTS_CLK~, and CTS_CLKQ~, which it outputs to a delay circuit 308. Multiplexer 304 provides a "quarter-clock" selection, i.e. ninety degree phase selection, of signal CTS_CLK. In effect, multiplexer 304 provides delaying signal CTS_CLK by a multiple (zero, one, two, three, for example) of a quarter period. Delay circuit 308 may delay the signal further and may output memory clock signal MCLK to a memory. In other words, delay circuit 308 provides fine-tuning of the quarter clock selection. Delay circuit 308, for example, may provide four-bit resolution with a ninety degree range such that between the quarter clock selection of multiplexer 304 and programmable delay 308, the phase of clock signal MCLK may be programmed between zero and 360 degrees.

Signal CTS_CLK at node A is also inverted by an inverter 318 forming a second CTS_CLK~, which is input to a multiplexer 302. Signal CTS_CLKQ is also inverted by an inverter 320 forming a second CTS_CLKQ~, which is input into multiplexer 302. Using a two-bit programmable input (not shown), multiplexer 302 selects one of four signals CTS_CLK, CTS_CLKQ, CTS_CLK~, and CTS_CLKQ~, which it outputs to an AND gate 328. The purpose of AND gate 328 is described below.

Multiplexer 302 provides a "quarter-clock" selection, i.e. ninety degree phase selection, of signal CTS_CLK. In effect, multiplexer 302 provides delaying signal CTS_CLK by a multiple (zero, one, two, three, for example) of a quarter period. The output of AND gate 328 feeds through delay circuit 306. Delay circuit 306 may delay the signal and may output data strobe signal DQS. Delay circuit 306 provides fine-tuning of the quarter clock selection of multiplexer 302. Delay circuit 306, for example, may provide four-bit resolution with a ninety degree range such that between the quarter clock selection of multiplexer 302 and programmable delay 306, the phase of strobe signal DQS may be programmed between zero and 360 degrees.

Figure 1:
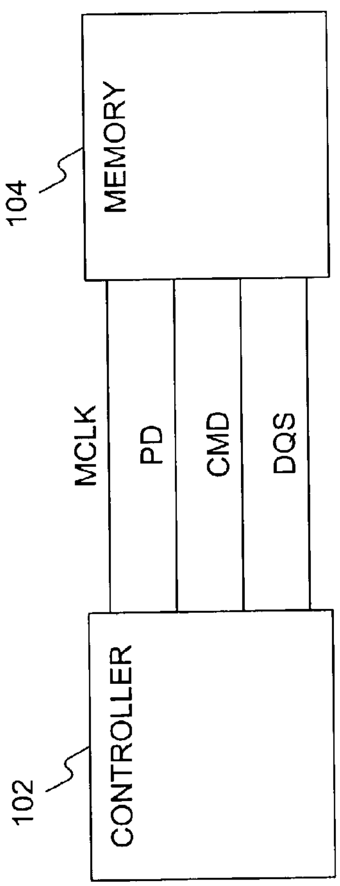
FIG. 1 is a block diagram of a controller circuit and a memory connected together.
Figure 2:
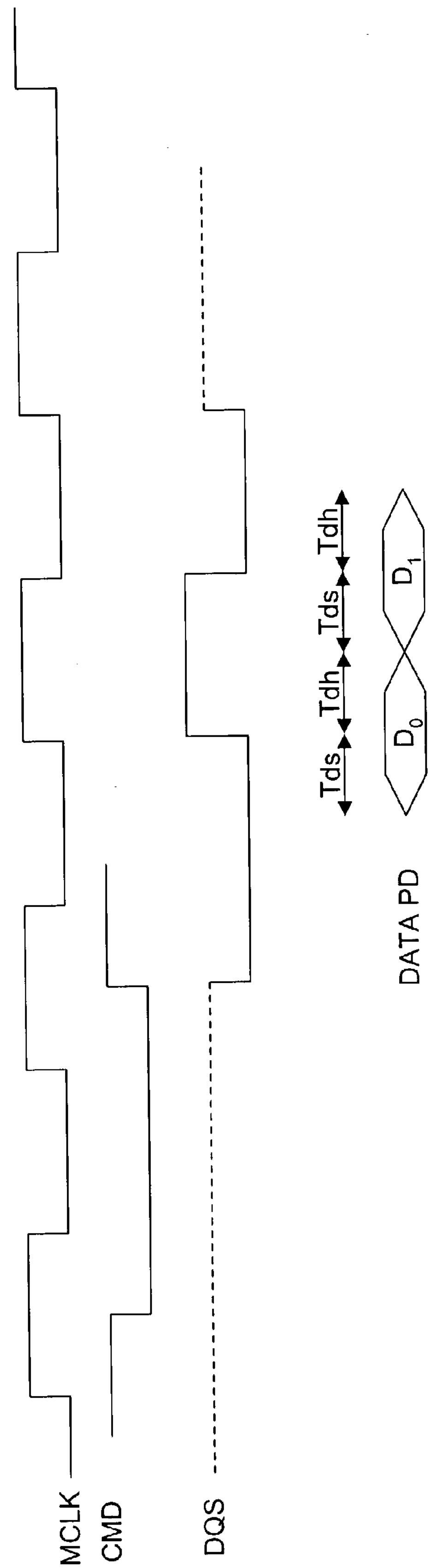
FIG. 2 is a timing diagram for writing data to a memory.

As shown in the timing diagram of in FIG. 2, at times strobe signal DQS may not oscillate on and off, such as when no data is being written to memory 104. Referring to FIG. 3, AND gate 328 multiplies the output of multiplexer 302 by the logic value that appears at a node C. If the logic value at node C is "zero," then the output of AND gate 328 is also "zero" and signal DQS does not oscillate on and off. If the logic value at node C is "one" then the output of AND gate 328 will follow the output of multiplexer 302 and strobe signal DQS oscillates on and off. The value at node C is selected by a multiplexer 326 as being one of pre_dqs_mclk, pre_dqs_mclk#, pre_dqs_mclkq, or pre_dqs_mclkq#. The signals pre_dqs_mclk, pre_dqs_mclk#, pre_dqs_mclkq, and pre_dqs_mclkq# determine when data strobe signal DQS starts to oscillate after a command, such as the write command, is executed. Signal pre_dqs_mclkq is ahead of signal pre_dqs_mclk by ninety degrees (as measured by CTS_CLK); signal pre_dqs_mclkq# is behind signal pre_dqs_mclkq by 180 degrees (as measured by CTS_CLK); signal pre_dqs_mclk# is behind signal pre_dqs mclk by 180 degrees (as measured by CTS_CLK).

In the embodiment of FIG. 3, signal CTS_CLK is also used by a flip-flop 316 to latch data out of a controller circuit as data signal PD. Note that in this embodiment, data signal PD is effectively the reference signal to which strobe signal DQS and clock signal MCLK are adjusted.

In one embodiment of the invention, there are multiple data signals, such as data signal PD, that span multiple data channels between controller 102 and memory 104. For example, there may be 2, 4, 8 16, 32, or 64 data channels and data signals. In this instance, memory 104 may simultaneously latch many data signals into memory. It may be desirable to delay some of the data signals, such as data signal PD, to prevent simultaneous latching that may result if every data channel had the same phase. Delaying some of the data channels, creating different phases, may reduce instantaneous power consumption because not all the switching current is being drawn from the power supply at once. Thus, in this embodiment, flip-flop 316 may use a delayed signal CTS_CLK. Using a two-bit input multiplexer 330, the CTS_CLK may be delayed by zero phase, by a delay circuit 332, by delay circuit 332 and a delay circuit 334, or by delay circuits 332, 334, and a delay circuit 336. A value for the delay time of delay circuits 332, 334, and 336 may be 200 picoseconds, for example.

A user may program the circuit shown in FIG. 3 to allow the rising and falling edge of strobe signal DQS and clock signal MCLK to be lined appropriately with data signal PD. Programming comprises selecting the appropriate signal in multiplexers 302, 304, 330 and 326 and selecting the delay in delay circuits 306 and 308. In one embodiment, multiplexers 302, 304, and 326 all are programmed to the same quarter-clock selection. For example, multiplexers 302 and 304 may be programmed to select CTS_CLK and multiplexer 326 may be programmed to select pre_dqs_mclk. As another example, multiplexers 302 and 304 may be programmed to select CTS_CLK~ and multiplexer 326 may be programmed to select pre_dqs_mclk#. As another example, multiplexers 302 and 304 may be programmed to select CTS_CLKQ and multiplexer 326 may be programmed to select pre_dqs_mclkq. Finally, multiplexers 302 and 304 may be programmed to select CTS_CLKQ~ and multiplexer 326 may be programmed to select pre_dqs_mclkq#. A phase detector 340 detects the phase between data signal PD, strobe signal DQS, and clock signal MCLK.

Figure 4:
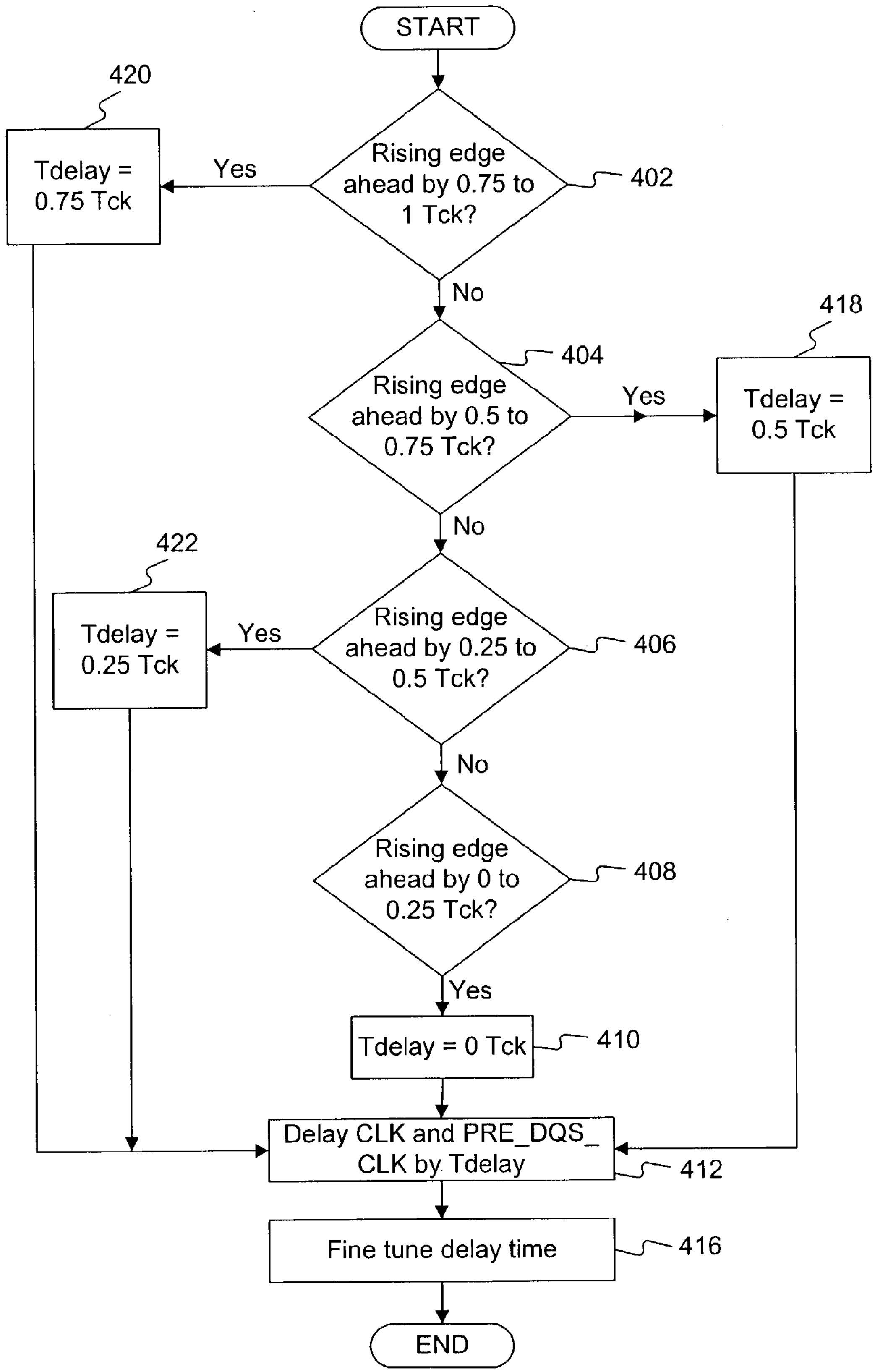
FIG. 4 is a flow chart of a method consistent with this invention for programming the circuit of FIG. 3.

FIG. 4 is a flow chart of a method consistent with this invention for programming the circuit of FIG. 3. In this embodiment, data signal PD is used as a reference clock. If the rising edge of the clock signal MCLK and strobe signal DQS are ahead of data signal PD by 0.75 to 1 times a period of the clock (Tck) (step 402), a delay time (Tdelay) is set to 0.75 Tck (step 420). If the rising edge of clock signal MCLK and strobe signal DQS are ahead of data signal PD by 0.5 to 0.75 times the period of the clock Tck (step 404), then the delay time Tdelay is set to 0.5 Tck (step 418). If the rising edge of the clock signal MCLK and strobe signal DQS are ahead of data signal PD by 0.25 to 0.5 times the period of the clock Tck (step 406), then the time delay Tdelay is set to 0.25 Tck (step 422). If the rising edge of clock signal MCLK and strobe signal DQS are ahead of data signal PD by 0 to 0.25 times the period of the clock Tck (step 408), then the time delay Tdelay is set to 0 Tck (step 410). In this embodiment, the value of delay time Tdelay determines whether to select CTS_CLK, CTS_CLKQ, CTS_CLK~, or CTS_CLKQ~ in multiplexers 302 and 304 and whether to select pre_dqs_mclk, pre_dqs_mclk#, pre_dqs_mclkq, and pre_dqs_mclkq# in multiplexer 326 (step 412). After the signals are chosen in multiplexers 302, 304, and 306, then the delay time is adjusted using delay circuits 306 and 308 (step 416).

Table I shows a delay table consistent with this invention for programmable delay circuits such as delay circuits 306 and 308 of FIG. 3. The first column in Table I lists the different four-bit selections. The second column lists the longest delay time for the rising edge of a signal through the delay circuit for the particular delay selection. The third column lists the shortest delay time for the rising edge of a signal through the delay circuit for the particular delay selection. The fourth column lists the longest delay time for the falling edge of a signal through the delay circuit for the particular delay selection. The fifth column lists the shortest delay time for the falling edge of a signal through the delay circuit for the particular delay selection. In another embodiment, the delay circuits are fixed delays and not programmable.

TABLE I

| Programmable Delay | | | | |
|---|---|---|---|---|
| Delay Bit Selection | Longest Rising Edge Delay (ns) | Shortest Rising Edge Delay (ns) | Longest Falling Edge Delay (ns) | Shortest Falling Edge Delay (ns) |
| 0000 | 0.3788 | 0.3997 | 0.1800 | 0.2058 |
| 0001 | 1.2800 | 1.3400 | 0.5169 | 0.5621 |
| 0010 | 1.5280 | 1.5190 | 0.6483 | 0.6426 |
| 0011 | 1.8460 | 1.9100 | 0.7890 | 0.8147 |
| 0100 | 1.9780 | 2.0020 | 0.8383 | 0.8786 |
| 0101 | 2.3110 | 2.4050 | 0.9574 | 1.0490 |
| 0110 | 2.5680 | 2.5560 | 1.0730 | 1.1220 |
| 0111 | 2.9240 | 2.9590 | 1.2370 | 1.3010 |
| 1000 | 2.9260 | 2.8640 | 1.2810 | 1.2840 |
| 1001 | 3.2520 | 3.2630 | 1.3690 | 1.4520 |
| 1010 | 3.5520 | 3.4360 | 1.5530 | 1.5320 |
| 1011 | 3.8640 | 3.8350 | 1.6870 | 1.7120 |
| 1100 | 3.9470 | 3.9600 | 1.6700 | 1.7770 |
| 1101 | 4.3110 | 4.3360 | 1.8960 | 1.9450 |
| 1110 | 4.5480 | 4.5230 | 2.0200 | 2.0110 |
| 1111 | 4.9180 | 4.9200 | 2.1580 | 2.1820 |

Figure 5:
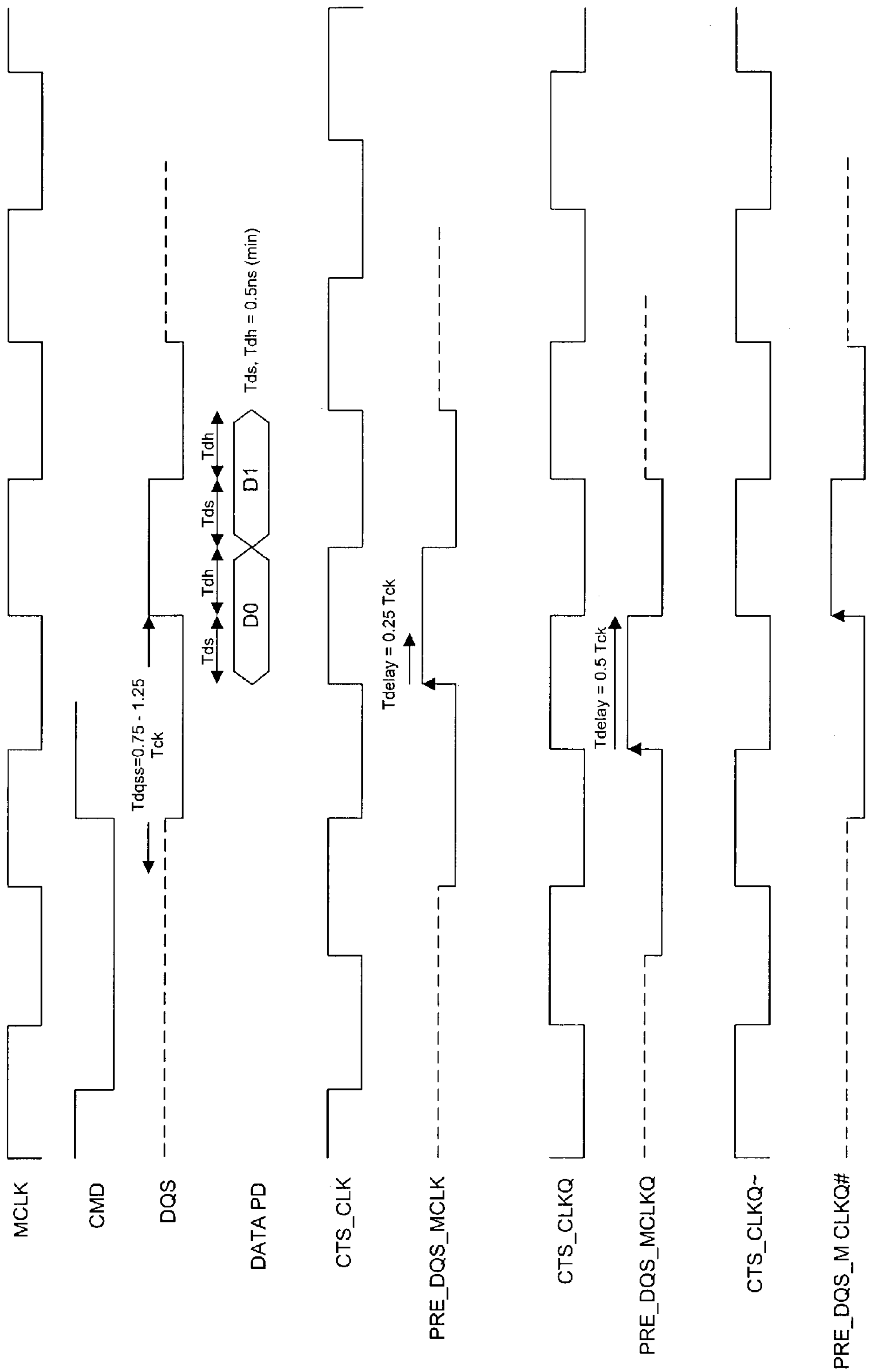
FIG. 5 is a signal timing diagram consistent with this invention.

FIG. 5 is a signal timing diagram consistent with this invention. As described above, clock signal MCLK, command signal CMD, data strobe signal DQS, and data signal PD are supplied by controller 102 to memory 104. Similar to the example in FIG. 2, in FIG. 5, command signal CMD issues a write command at the rising edge of signal MCLK. It one embodiment, the rising or falling edge of data strobe signal DQS is timed so that it may properly latch data signal PD into memory 104.

Signal CTS_CLK, shown in FIG. 5, is the signal that appears at node A in FIG. 3. Signal CTS_CLKQ, shown in FIG. 5, is the signal that appears at node B in FIG. 3. Signal CTS_CLKQ~ appears after inverters 320 and 324 in FIG. 3.

FIG. 5 also shows a signal PRE_DQS_MCLK, which appears at a node E when multiplexer 326 selects signal pre_dqs_mclk. Signal PRE_DQS_MCLK is the product of the output of multiplexer 302 and node C. Signal PRE_DQS_MCLKQ appears at node E when multiplexer 326 selects signal pre_dqs_mclkq. Signal PRE_DQS_MCLKQ is the product of the output of multiplexer 302 and node C. Signal PRE_DQS_MCLK# (not shown in FIG. 5) appears at node E when multiplexer 326 selects signal pre_dqs_mclk# (not shown in FIG. 5). Signal PRE_DQS_MCLK# is the product of the output of multiplexer 302 and node C. Finally, signal PRE_DQS_MCLKQ# appears at node E when multiplexer 326 selects signal pre_dqs_mclkq#. Signal PRE_DQS_MCLKQ# is the product of the output of multiplexer 302 and node C.

Figure 6:
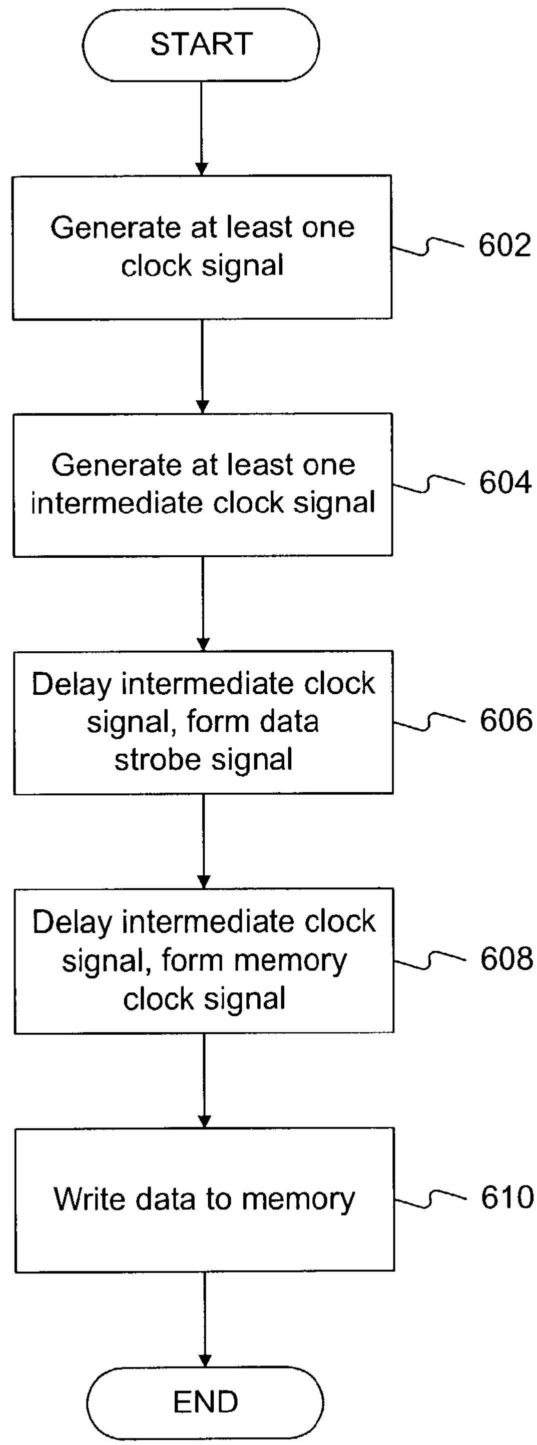
FIG. 6 is a flow chart of a method consistent with this invention for writing data to a memory.

FIG. 6 is a flow chart of a method consistent with this invention for writing data to a memory. Methods and systems consistent with this invention generate at least one clock signal (step 602), such as CLK or CLKQ shown in FIG. 3. Such methods and systems then may generate at least one intermediate clock signal from the clock signal using a clock tree buffer (step 604), such as CTS_CLK or CTS_CLKQ. Such methods and systems may then delay the at least one intermediate clock signal to form a data strobe signal (step 606), such as data strobe signal DQS. Methods and systems consistent with this invention may then also delay the at least one intermediate clock signal to form the memory clock signal (step 608), such as signal MCLK. Finally, such methods and systems may write the data to the memory using the data strobe signal and a memory clock signal (step 610).

A method and apparatus for reading data from a memory is found in U.S. patent application Ser. No. 10/404,425 filed Apr. 2, 2003, entitled "Method and Apparatus for Reading Data From a Memory," and is hereby incorporated by reference.

Figure 7:
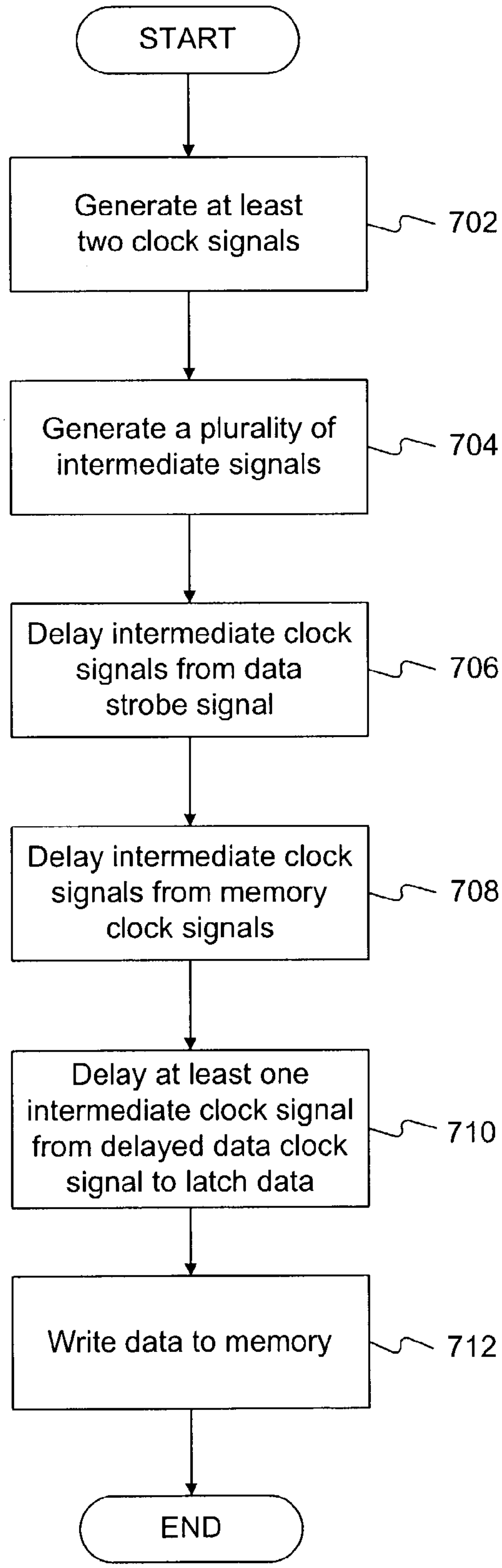
FIG. 7 is a flow chart of a method consistent with this invention for writing data to a memory with a two-phase-shifted base clock signal.

FIG. 7 is a flow chart of a method consistent with this invention for writing data to a memory with a two-phase-shifted base clock signals (from PLL 310). Methods and systems consistent with this invention generate at least two clock signals (step 702), such as CLK and CLKQ shown in FIG. 3, and these two clock signals can have a specific phase shift of a fraction of one clock, for example, a quarter of one clock. Such methods and systems then may generate a plurality of intermediate clock signals from the at least two clock signals using a clock tree buffer (step 704), such as the signals CTS_CLK, CTS_CLK~, CTS_CLKQ, and CTS_CLKQ~. Such methods and systems may then delay the plurality of intermediate clock signals to form a data strobe signal (step 706), such as data strobe signal DQS. Methods and systems consistent with this invention may then also delay the plurality of intermediate clock signal to form the memory clock signal (step 708), such as signal MCLK. Methods and systems consistent with this invention may then also delay at least one of the plurality of intermediate clock signal to form the data clock signal to latch data signal of the data channel (step 710), such as data signal PD. Finally, such methods and systems may write the data to the memory using the data strobe signal and a memory clock signal (step 712).

Other embodiments of the invention will be apparent to those skilled in the art from consideration of the specification and practice of the invention disclosed herein. In the claims an in the specification "a memory," such as memory 104, may comprise a single memory chip or more than one memory chip. Further, controller 102 and memory 104 may be separate chips or may be on the same chip. Also, the quarter clock selection could be a selection of a fractional period of the clock signal other than a quarter, for example. Further, methods and systems consistent with this invention may generate a plurality of each of (1) clock signals; (2) intermediate clock signals; (2) memory clock signals; (3) data strobe signals; (4).

It is intended that the specification and examples be considered as exemplary only, with a true scope and spirit of the invention being indicated by the following claims.

What is claimed is:

1. A method for writing data to a memory, the method comprising:

generating at least one clock signal;

generating at least one intermediate clock signal from the at least one clock signal using at least one clock tree buffer;

delaying the at least one intermediate clock signal to form at least one data strobe signal;

delaying the at least one intermediate clock signal to form at least one memory clock signal;

determining a lead time that the at least one memory clock signal is ahead of a data reference signal;

delaying the at least one memory clock signal by the lead time, and writing the data to the memory using the at least one data strobe signal and the at least one memory clock signal.

2. The method of claim 1, wherein delaying the intermediate clock signal to form the memory clock signal comprises delaying the intermediate clock signal by a multiple of a fractional period of the intermediate clock signal; and delaying the intermediate clock signal further by a fraction of the fractional period of the intermediate clock signal.

3. The method of claim 2, wherein delaying the intermediate clock signal by a multiple of the fractional period comprises inverting the intermediate clock signal;

delaying the intermediate clock signal by the fractional period to form a phase shifted intermediate clock signal;

inverting the phase shifted intermediate clock signal; and selecting one of the intermediate clock signal, the inverted intermediate clock signal, the phase shifted intermediate clock signal, and the inverted phase shifted intermediate clock signal.

4. The method of claim 3, wherein the fractional period is a quarter period.

5. The method of claim 1, wherein delaying the intermediate clock signal to form a data strobe signal comprises delaying the intermediate clock signal by a multiple of a fractional period of the intermediate clock signal; and delaying the intermediate clock signal further by a fraction of the fractional period of the intermediate clock signal.

6. The method of claim 5, wherein delaying the intermediate clock signal by a multiple of the fractional period comprises inverting the intermediate clock signal;

delaying the intermediate clock signal by the fractional period to form a phase shifted intermediate clock signal;

inverting the phase shifted intermediate clock signal; and selecting one of the intermediate clock signal, the inverted intermediate clock signal, the phase shifted intermediate clock signal, and the inverted phase shifted intermediate clock signal.

7. The method of claim 6, wherein the fractional period is a quarter period.

8. The method of claim 6, further including ANDing the selected signal with one of a logic one and a logic zero.

9. The method of claim 1, further comprising delaying the data in a first data channel so that the data in the first data channel is latched into the memory at a different time than data in a second data channel.

10. The method of claim 1, further comprising:

delaying data in a first data channel so that the data in the first data channel is latched into the memory at a different time than data in a second data channel, wherein the first data channel carries the data from a controller circuit to the memory and the second data channel carries the data from the controller circuit to the memory.

11. A circuit for writing data to a memory, the circuit comprising:

a clock generator to generate at least one clock signal;

at least one clock tree buffer to generate at least one intermediate clock signal from the at least one clock signal;

a first delay circuit to generate at least one data strobe signal from the at least one intermediate clock signal, and a second delay circuit to generate at least one memory clock signal from the at least one intermediate clock signal wherein a lead time that the at least one memory clock signal is ahead of a data reference signal is determined;

the at least one memory clock signal being delayed by the lead time; and the at least one data strobe signal and the at least one memory clock signal are used to latch the data into the memory.

12. The circuit of claim 11, wherein the second delay circuit comprises a delay circuit to delay the intermediate clock signal by a multiple of a fractional period of the intermediate clock signal; and a delay circuit to delay the intermediate clock signal further by a fraction of the fractional period of the intermediate clock signal.

13. The circuit of claim 12, wherein the delay circuit to delay the intermediate clock signal by a multiple of the fractional period comprises an inverter circuit to invert the intermediate clock signal;

a delay circuit to delay the intermediate clock signal by the fractional period to form a phase shifted intermediate clock signal;

an inverter circuit to invert the phase shifted intermediate clock signal; and a selecting circuit to select one of the intermediate clock signal, the inverted intermediate clock signal, the phase shifted intermediate clock signal, and the inverted phase shifted intermediate clock signal.

14. The circuit of claim 13, wherein the fractional period is a quarter period.

15. The circuit of claim 11, wherein the first delay circuit comprises a delay circuit to delay the intermediate clock signal by a multiple of a fractional period of the intermediate clock signal; and a delay circuit to delay the intermediate clock signal further by a fraction of the fractional period of the intermediate clock signal.

16. The circuit of claim 15, wherein the delay circuit to the intermediate clock signal by a multiple of the fractional period comprises an inverter circuit to invert the intermediate clock signal;

a delay circuit to delay the intermediate clock signal by the fractional period to form a phase shifted intermediate clock signal;

an inverter circuit to invert the phase shifted intermediate clock signal; and a selecting circuit to select one of the intermediate clock signal, the inverted intermediate clock signal, the phase shifted intermediate clock signal, and the inverted phase shifted intermediate clock signal.

17. The circuit of claim 16, wherein the fractional period is a quarter period.

18. The circuit of claim 16 further including an ANDing circuit inputting the selected signal and one of a logic one and a logic zero.

19. The circuit of claim 11, further comprising a delay circuit to delay the data in a first data channel so that the data in the first data channel is latched into the memory at a different time than data in a second data channel.

20. The circuit of claim 11, further comprising a controller circuit for writing data to the memory, the controller circuit comprising a first data channel to carry data from the controller circuit to the memory, a second data channel to carry data from the controller circuit to the memory, and a delay circuit to delay the data in the first data channel so that the data in the first data channel is latched into the memory at a different time than the data in the second data channel.

21. A method of programming a circuit for writing data to a memory, the method comprising:

determining a first lead time that a memory clock signal is ahead of a data reference signal;

determining a second lead time that a data strobe signal is ahead of the data reference signal;

delaying the memory clock signal by the first lead time and the data strobe signal by the second lead time; and writing the data to the memory using the data strobe signal and the memory clock signal.

22. The method of claim 21, wherein determining a first lead time comprises determining a multiple of a fractional period of the memory clock signal and delaying the memory clock signal by the multiple of the fractional period.

23. The method of 22, wherein the fractional period is a quarter period.

24. The method of 21, wherein determining the second lead time comprises determining a multiple of a fractional period of the data strobe signal and delaying the data strobe signal by the multiple of the fractional period.

25. The method of 24, wherein the fractional period is a quarter period.

26. The method of claim 21, further comprising generating a clock signal;

generating an intermediate clock signal from the clock signal using a clock tree buffer;

delaying the intermediate clock signal to form the data strobe signal; and writing the data to the memory using the data strobe signal and the memory clock signal.

27. The method of claim 26, further comprising delaying the intermediate clock signal to form the memory clock signal.

28. A method for writing data to a memory, the method comprising:

generating a plurality phase-shifted clock signals;

generating a plurality of first phase-shifted intermediate clock signals from the plurality of phase-shifted clock signals using a plurality of clock tree buffers;

delaying at least one of the plurality of first phase-shifted intermediate clock signals to form a data strobe signal;

delaying at least one of the plurality of first intermediate clock signals to form a memory clock signal;

determining a lead time that the at least one memory clock signal is ahead of a data reference signal;

delaying the at least one memory clock signal by the lead time, and writing data to the memory using the data strobe signal and the memory clock signal.

29. The method of claim 28, wherein delaying the plurality of first intermediate clock signals to form the memory clock signal comprises generating a plurality of second phase-shifted intermediate clock signals from the first phase-shifted intermediate clock signals;

generating a third intermediate clock signal by selecting one of the second phase-shifted intermediate clock signals;

delaying the third intermediate clock signals to form the memory clock signal.

30. The method of claim 29, wherein said plurality of second intermediate clock signals comprise a first shifted phase of a fractional period of the first phase-shifted intermediate clock signal and wherein delaying the third intermediate clock signals to form the memory clock signal comprises delaying the third intermediate clock signal by a second shifted phase of fraction of the first shifted phase.

31. The method of claim 30, wherein the first shifted phase is a quarter period of the first phase-shifted intermediate clock signal.

32. The method of claim 29, wherein said plurality of second phase-shifted intermediate clock signals comprises a first one of the second phase-shifted intermediate clock signals from a first of the plurality of clock tree buffers;

a second one of the second phase-shifted intermediate clock signals generated from inverting the first one of the second phase-shifted intermediate clock signals;

a third one of the second phase-shifted intermediate clock signals from a second of the plurality clock tree buffers; and, a fourth one of the second phase-shifted intermediate clock signals generated from inverting the third one of the second phase-shifted intermediate clock signals.

33. The method of claim 28, wherein delaying the plurality of first intermediate clock signals to form the data strobe signal comprises generating a plurality of fourth phase-shifted intermediate clock signals from the first phase-shifted intermediate clock signals;

generating a fifth intermediate clock signals by selecting one of the fourth phase-shifted intermediate clock signals;

delaying the fifth intermediate clock signals to form the data strobe signal.

34. The method of claim 33, wherein said plurality of fourth intermediate clock signals comprise a third shifted phase of a fractional period of the first phase-shifted intermediate clock signal and wherein delaying the fifth intermediate clock signals to form the memory clock signal comprises delaying the fifth intermediate clock signal by a fourth shifted phase of fraction of the third shifted phase.

35. The method of claim 33, wherein said plurality of fourth phase-shifted intermediate clock signals comprises a first one of the fourth phase-shifted intermediate clock signals from a first of the plurality of clock tree buffers;

a second one of the fourth phase-shifted intermediate clock signals generated from inverting the first one of the phase-shifted second intermediate clock signal;

a third one of the fourth phase-shifted intermediate clock signals from a second of the plurality clock tree buffers; and a fourth one of the fourth phase-shifted intermediate clock signals generated from inverting the third one of the phase-shifted second intermediate clock signals.

36. The method of claim 33, further comprising ANDing the selected signal with one of a logic one and a logic zero.

37. The method of claim 28, wherein the data strobe signal is centered in the data signals.

38. The method of claim 37, wherein the data signals are delayed by a delayed data clock generated from one of the first phase-shifted intermediate clock signals.

39. A circuit for writing data to a memory, the circuit comprising:

a clock generator to generate a plurality of phase-shifted clock signals;

a plurality of clock tree buffers to generate a plurality of first intermediate clock signals from the plurality of phase-shifted clock signals; and a delay circuit to generate a data strobe signal and a memory clock signal from the first intermediate clock signals, wherein a lead time that the memory clock signal is ahead of a data reference signal is determined;

the memory clock signal being delayed by the lead time, and the data strobe signal and the memory clock signal are used to latch data into the memory.

40. The circuit of claim 39, wherein the delay circuit comprises a first delay circuit to delay at least one of the first intermediate clock signals by a fractional period of the first intermediate clock signal; and a second delay circuit to delay the first intermediate clock signals further by a fraction of the fractional period of the intermediate clock signal;

whereby the memory clock signal is generated.

41. The circuit of claim 40, wherein the first delay circuit comprises a selecting circuit to select one of the following signals as an input to the second delay circuit:

a first one of the first intermediate clock signals from a first of the plurality of clock tree buffers;

a second one of the first intermediate clock signals generated from inverting the first one of the first intermediate clock signal;

a third one of the first intermediate clock signals from a second of the plurality clock tree buffers; and, a fourth one of the first intermediate clock signals generated from inverting the third one of the first intermediate clock signal.

42. The circuit of claim 39, wherein the delay circuit comprises a first delay circuit to delay the first intermediate clock signals by a fractional period of the first intermediate clock signal; and a second delay circuit to delay the first intermediate clock signals further by a fraction of the fractional period of the intermediate clock signal;

whereby the data strobe signal is generated.

43. The circuit of claim 42, wherein the first delay circuit comprises a selecting circuit to select one of the following signals as an input to the second delay circuit:

a first one of the first intermediate clock signals from a first of the plurality of clock tree buffers;

a second one of the first intermediate clock signals generated from inverting the first one of the first intermediate clock signal;

a third one of the first intermediate clock signals from a second of the plurality clock tree buffers; and, a fourth one of the first intermediate clock signals generated from inverting the third one of the first intermediate clock signal.

44. The circuit of claim 42, further including an ANDing circuit inputting the delayed first intermediate clock signal and one of a logic one and a logic zero.

45. The circuit of claim 39, further comprises a data clock delay circuit for delay the data signals and the data strobe signal is centered in the data signals.

46. The method of claim 45, wherein the data clock delay circuit comprises a plurality of secondary data clock delay circuits to delay one of the plurality of first intermediate clock signal to generate a plurality of delayed data clock signals; and a selecting circuit to select one of the plurality of delayed data clock signals to the latch the data.

* * * * *